Oct. 25, 1932.  H. MÜLLER  1,885,000
RELIEF VALVE
Filed March 4, 1931
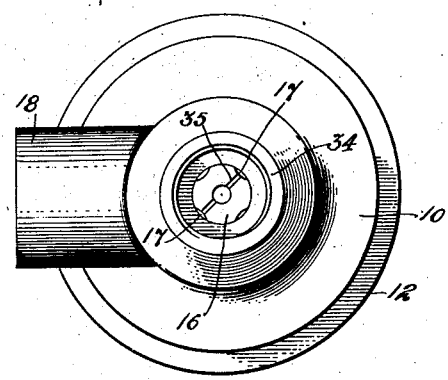
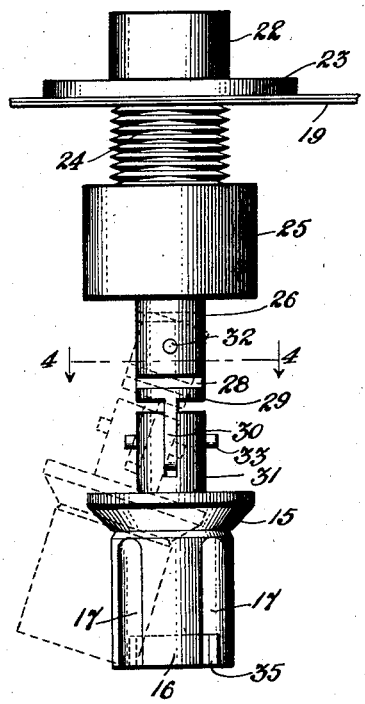
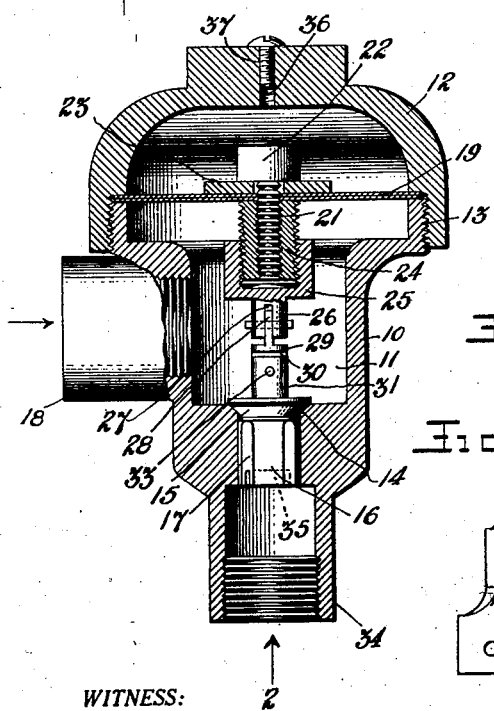
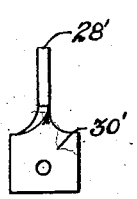
INVENTOR
Herman Müller
BY
Joshua R. H. Potts
HIS ATTORNEY Patented Oct. 25, 1932

1,885,000

UNITED STATES PATENT OFFICE

HERMAN MÜLLER, OF PHILADELPHIA, PENNSYLVANIA

RELIEF VALVE

Application filed March 4, 1931. Serial No. 519,983.

This invention relates to relief valves, and has for an object to provide a relief valve adapted to relieve excess fluid pressure and involving new and improved features of construction.

A further object of the invention is to provide a relief valve having improved means for seating the valve element accurately.

A further object of the invention is to provide means for adjusting the valve element to variable pressure relative to the actuating device.

The invention, therefore, comprises a housing having a resilient diaphragm therein which is positioned to be subjected to the fluid pressure and to be moved by excess pressure beyond the predetermined limit. A valve is connected with the diaphragm, having an improved universal joint connection whereby the valve unit is accurately seated after being open by the excess pressure operating upon the diaphragm, and providing further a chamber above the diaphragm which may be employed as an air cushion when desired.

The invention is directed to other objects and possesses other features of novelty and advantage, some of which, together with the foregoing, will be hereinafter more fully set forth.

In the drawing:

Figure 1 is a longitudinal diametrical sectional view through the improved relief valve.

Figure 2 is an inverted plan view, as indicated by arrow 2, at Figure 1,

Figure 3 is an enlarged detail elevation of the interior parts,

Figure 4 is a sectional view taken on line 4—4 of Figure 3, and

Figure 5 is a view in elevation of a modification of the universal joint unit.

Like characters of reference indicate corresponding parts throughout the several views.

The improved relief valve, which forms the subject matter of this application comprises a housing 10, having a chamber 11 formed therein, and a cap 12 engaged thereon preferably by screw threaded connection 13.

At the end of the chamber 11, opposite the cap 12, a valve seat 14 is provided and a valve 15 is proportioned for coaction therewith. The valve 15 has a pilot 16. As shown, this pilot is provided with grooves 17 for the passage of the fluid which enters the chamber 11 through the nipple 18 in the direction indicated by the arrow at that nipple.

A diaphragm 19 is rigidly connected at its perimeter by being clamped between the cap 12 and the body 10 as shown more particularly at Figure 1. Centrally, this diaphragm is perforated, and a screw 21 inserted therethrough. The screw 21 has a head 22 which clamps in engagement with a gasket 23 to provide a watertight joint. The screw 21 is engaged by a sleeve 24 which is threaded internally and externally, the internal thread making engagement with the screw 21. The external thread engages a cuff 25 which is internally threaded to coact therewith. The cuff 25 has an extension 26 slotted at 27 to receive one leaf 28 of the universal joint unit 29. The unit 29 has a second leaf 30 perpendicular to the leaf 28, as shown at Figures 1, 3 and 4. The valve 15 has an extension 31 engaging the leaf 30 of the unit and pintles 32 and 33 are employed for pivoting the leaves 28 and 30 in the slots of the extensions 26 and 31.

Instead of forming the universal joint unit as shown at 29, a slightly different modification is at times employed, as shown at Figure 5, comprising leaves 28' and 30', said unit being constructed of sheet material twisted as shown. In all other respects, this unit is the equivalent of the units shown at Figures 1 and 3.

The body 10 is provided with a nipple 34 for connection with an outflow conduit. The valve 16 is provided with means for engagement by a tool, being represented by the cut 35. This cut 35 would be the proper type to be engaged by a screw driver, but it is to be understood that other types of implement connection may be substituted.

The cap 12 is provided with a perforation 36 and a closure in the form of a screw 37 is provided therefor.

In operation, a tool is inserted through the nipple 34 into engagement with the cut 35, and by turning the valve 16, the cuff 25 is also rotated upon the threaded sleeve 24. This varies the interval between the valve 15 and the diaphragm 19. By experience, the clearance or tension attained by this adjustment will be determined so that the device may be properly adjusted for any required or desired fluid pressure within the chamber 11.

Fluid pressure being admitted as indicated by the arrow through the nipple 18 will occupy the chamber 11, and will bear against the valve 15 and the diaphragm 19. This will balance the valve to the extent of area ratio. The adjustment of the valve relative to the diaphragm will be such that the tension of the diaphragm plus the pressure upon the valve 15 will maintain the valve in closed position so long as the normal tension of the fluid within the chamber 11 is not exceeded.

When the pressure becomes excessive, the greater area of the diaphragm is acted upon by the fluid under pressure, and the valve 15 lifted from the seat 14. The fluid is permitted to escape thence through the grooves 17 in the pilot 16 until normal pressure has been restored, whereupon, the valve closes. By forming the valve to be subjected to the pressure within the chamber, a quick action is provided so that the valve will open instantly to the maximum capacity when the pressure exceds normal, and when the pressure returns to normal, will snap instantly to closing position. This prevents dripping or leaking through the valve. Also, by the quick action, the valve is more firmly seated.

Under some conditions of installation, it is desirable that there be an air cushion maintained above the diaphragm 19 within the cap 12. Under those conditions, the screw closure 37 remains in position as shown at Figure 1, completely closing the orifice 36. When, however, the installation is such as to make this air cushion unnecessary or undesirable, the screw closure 37 is removed and the perforation 36 permitted to balance the aerostatic pressure within the cap.

Of course, the relief valve, herein illustrated, may be modified in various ways without departing from the invention herein set forth and hereinafter claimed.

The invention is hereby claimed as follows:

A relief valve organization comprising a housing, a perforated diaphragm forming one side of a chamber within the housing, said chamber having inlet and outlet ports, a valve within the chamber normally closing a port, a threaded bolt through the perforation of the diaphragm, an internally and externally threaded bushing upon and functioning as a nut for the bolt, a sleeve adjustably positioned upon the bushing, and means connecting the sleeve and valve.

In testimony whereof I have signed my name to this specification.

HERMAN MÜLLER.